Figure 1:
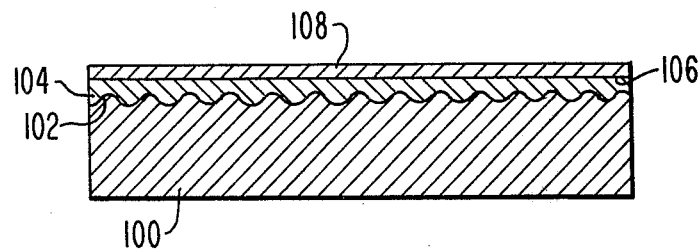

United States Patent [19]

Gale et al.

[11] 4,353,622

[45] Oct. 12, 1982

[54] RECORDING BLANK AND METHOD FOR FABRICATING THEREFROM DIFFRACTIVE SUBTRACTIVE FILTER METAL EMBOSSING MASTER

[75] Inventors: Michael T. Gale, Wettswil; James Kane, Zumikon, both of Switzerland

[73] Assignee: RCA Corporation, New York, N.Y.

[21] Appl. No.: 51,399

[22] Filed: Jun. 25, 1979

[51] Int. Cl.$^3$ .............................................. G02B 5/18
[52] U.S. Cl. ............................ 350/162 SF; 350/311;
  350/320; 430/321; 430/323; 430/325
[58] Field of Search ............ 350/162 R, 162 SF, 311,
  350/314, 320; 430/311, 321, 323, 325, 326, 329

[56] References Cited

U.S. PATENT DOCUMENTS

| | | | |
|---|---|---|---|
| 3,743,507 | 7/1973 | Ih et al. | 430/2 |
| 3,832,176 | 8/1974 | Verstraete et al. | 430/323 X |
| 3,957,354 | 5/1976 | Knop | 350/162 SF |
| 4,062,628 | 12/1977 | Gale | 350/162 R |
| 4,108,660 | 8/1978 | Gale et al. | 430/121 |
| 4,227,769 | 10/1980 | Phillips et al. | 350/162 R X |
| 4,259,433 | 3/1981 | Mizobuchi et al. | 430/323 X |
| 4,288,510 | 9/1981 | Tinet et al. | 430/321 X |

Primary Examiner—John D. Lee
Attorney, Agent, or Firm—Samuel Cohen; Joseph S. Tripoli; George J. Seligsohn

[57] ABSTRACT

The recording blank comprises a substrate having a non-etchable surface which incorporates a given surface relief pattern diffractive structure, an etchable metal overcoating in contact with the diffractive structure which overcoating has a smooth exterior surface, and a photoresist layer in contact with this smooth exterior surface. This permits a simple technique to be employed in fabricating a high quality embossing master.

5 Claims, 2 Drawing Figures

RECORDING BLANK AND METHOD FOR FABRICATING THEREFROM DIFFRACTIVE SUBTRACTIVE FILTER METAL EMBOSSING MASTER

This invention relates to a certain type of recording blank for use in recording a metal master of a given surface relief diffractive structure spatially modulated by screened spatial information and, also, to a method employing this certain type of recording blank for fabricating a metal master to be used in embossing a diffractive subtractive filter.

Reference is made to U.S. Pat. No. 4,108,660, issued to us on Aug. 22, 1978, which relates to a method for fabricating a master to be used in hot embossing into a thermoplastic film a diffractive subtractive filter. Briefly, the method disclosed in this patent employs a recording blank comprising a substrate having a given surface thereof formed of at least one set of spaced line ridges defining a diffraction grating of a given profile and depth, the given surface having a photoresist deposed thereon which fills the space between adjacent line ridges and provides a substantially smooth exterior surface. (Such a recording blank forms the subject matter of U.S. Pat. No. 3,743,507, issued July 3, 1973 to Ih et al.) Such a recording blank, like unexposed photographic film, contains no picture information. In accordance with the method disclosed in our aforesaid U.S. Pat. No. 4,108,660, screened picture-imaging information, defined by a spatial arrangement of contiguous white-manifesting regions and non-white (i.e. either black or color) manifesting regions is added to the recording blank to thereby fabricate a master to be used in embossing a diffractive subtractive filter into a thermoplastic film. The disclosed method comprises the steps of: (a) exposing the photoresist to light manifesting the certain picture-image information; (b) removing all of the exposed photoresist from solely the white-manifesting regions thereby to reveal entirely the spaced line ridges of only those portions of the surface of the substrate underlying the white-manifesting regions; (c) leveling solely the revealed portion of the surface of the substrate to obliterate the spaced lines ridges of the white-manifesting regions, and (d) then removing all of the remaining photoresist to reveal entirely the spaced line ridges underlying the non-white manifesting regions of the exposed photoresist. The substrate of the recording blank may be made out of metal and leveling step (c) may be accomplished by electroplating the revealed portions of the substrate surface, etching the revealed portions of the substrate surface, or by a combination of alternately electroplating and electrolytically etching the revealed portion of the substrate. In any case, the purpose of such electroplating and/or etching is to provide a smooth area on the master defining each white-manifesting region of the picture-image information.

A benefit of the fabrication method disclosed in our aforesaid U.S. Pat. No. 4,108,660 is that it makes it possible to separate the manufacture of standard recording blanks, containing no picture information, from the fabrication of the master containing picture information. This permits the production of a master from a standard recording blank by a fabricator. The master may be used by the fabricator to hot emboss into a thermoplastic film a diffractive subtractive filter representing picture information, such as a microfiche. The need for highly sophisticated instrumentation and techniques is restricted to the manufacturer of the standard recording blanks, and is not required by the fabricator. This is analogous to the situation in photography, where standard types of unexposed, undeveloped film are manufactured by only sophisticated manufacturers, while unsophisticated fabricators make use of the unexposed film by exposing the film to picture-manifesting light, developing the exposed film and then employing the resulting product for such purposes as microfiche.

Use of the present invention further reduces the need for relatively sophisticated instrumentation and techniques on the part of the fabricator. More specifically, when an embossed thermoplastic diffractive subtractive filter, such as a microfiche, is read out (by such means as a projector, etc.), the brightness, whiteness and quality of the white-manifesting regions of the projected picture-image information is determined by the degree of perfection in the smoothness of those portions of the embossing master corresponding to these white-manifesting regions. In the above-discussed prior art, this desired degree of perfection in smoothness, in turn, depends upon the degree of perfection with which the electroplating and/or etching step in fabricating the master is accomplished (which requires a certain sophistication on the part of the fabricator).

The recording blank of the present invention comprises a substrate having a given surface composed of a first given metal that is substantially inert to a given etchant. The surface of the substrate incorporates a given surface relief pattern diffractive structure unmodulated by screened spatial information. Further, the given surface of the substrate is covered by a layer of a second given metal which is etched by the given etchant. The layer of the second given metal has one of two opposite surfaces thereof in intimate contact with the given surface relief pattern, the other of its two opposite surfaces, which is smooth and level, being covered by a layer of photoresist. Such a recording blank may be used to fabricate a diffractive subtractive filter embossing master by a method comprising the steps of (a) exposing the photoresist to light manifesting certain picture-image information; (b) removing all of the photoresist from solely non-white manifesting regions thereby to reveal only those portions of the exterior surface of the second given metal layer underlying the non-white manifesting regions of the exposed photoresist; (c) etching the revealed portions of the given metal layer with a given etchant to now reveal spaced line ridges of the diffractive structure of only those portions of the given surface of the substrate underlying the non-white manifesting regions, and (d) then removing all the remaining photoresist to now reveal those portions of the exterior surface of the second given metal layer underlying the white-manifesting regions of the exposed photoresist.

Figure 2:
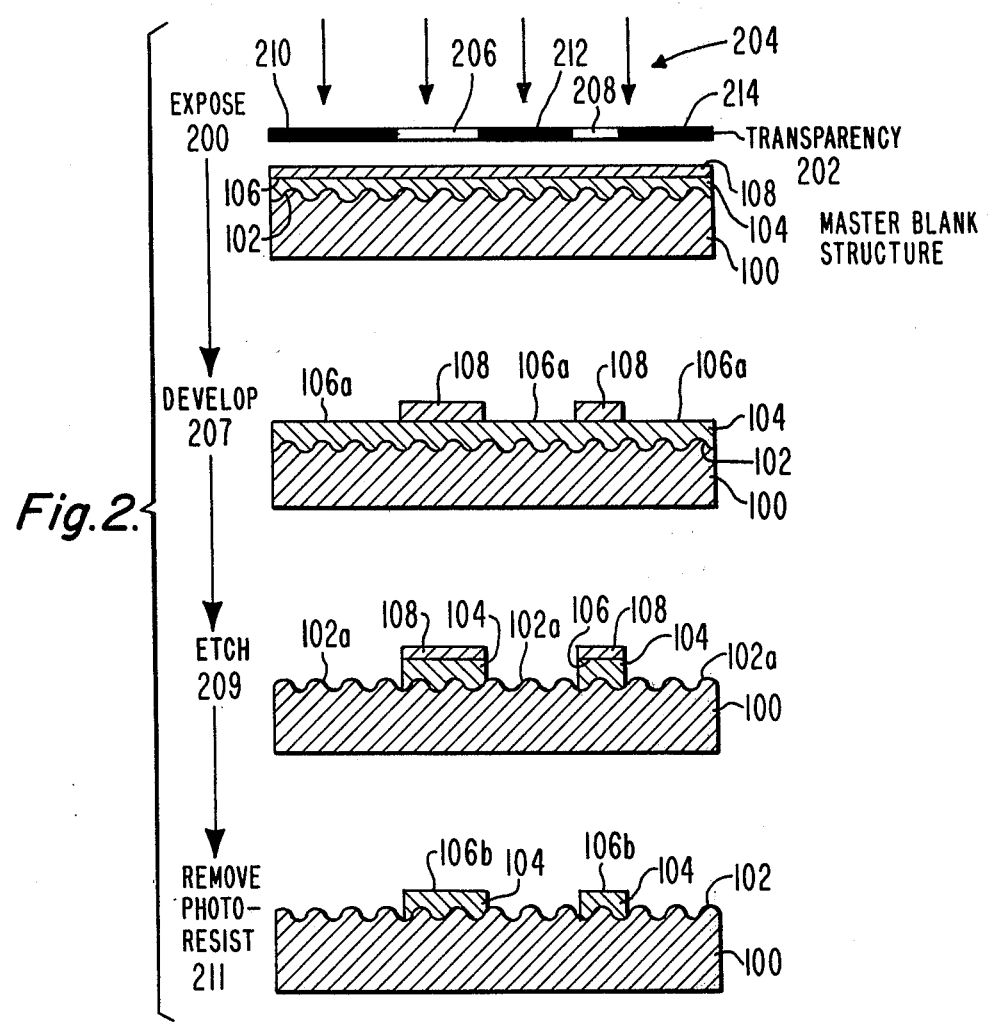

In the drawings:

FIG. 1 diagrammatically illustrates a recording blank embodying the principles of the present invention, and FIG. 2 is a flow chart illustrating successive steps for preparing a diffractive subtractive filter embossing master starting with the recording blank of FIG. 1.

Referring to FIG. 1, substrate 100 is comprised of a foil composed of a first metal, such as nickel for example. Preferably, the thickness of the first metal foil is approximately 100 μm. The upper surface 102 of substrate 100 incorporates given surface relief pattern diffractive structure. This diffractive structure may comprise one or more sinusoidal gratings of the type described in U.S. Pat. No. 4,062,628, issued to Gale, in which the master recording blank is to be used to fabricate a blank-and-white-diffractive subtractive filter embossing master. Alternatively, the diffractive structure may be a rectangular grating of the type described in U.S. Pat. No. 3,957,354 issued to Knop, in which the recording blank is to be used to fabricate a color diffractive subtractive filter embossing master.

Filter 102 is covered by a layer 104 composed of the second given metal, such as tin, zinc, aluminum, chromium or copper, for example. Preferably, the thickness of layer 104 should be approximately 2 μm. In any case, the first metal of which surface 102 and substrate 100 is composed and the second metal of which layer 104 is composed must be selected so that the second metal is etched by a given etchant to which the first metal is substantially inert (and therefore does not etch).

The exterior surface 106 of layer 104 is smooth and level preferably to a high degree of perfection. Covering exterior surface 106 is a thin layer (approximately 1 μm in thickness) of photoresist 108.

A modified structure for the recording blank of FIG. 1, employs the same metal, such as nickel, for the volume of substrate 100 and for layer 104. However, in this modified structure, surface 102 has a thin (50–100 nm) film of gold (or some other material inert to the etchant being used) evaporated thereon to provide a barrier layer between the volume of substrate 100 and layer 104 at surface 102. The barrier layer at surface 102 prevents any portion of substrate 100 from being etched by the etchant of layer 104, despite the fact that layer 104 in the volume of substrate 100 are composed of the same metal.

Layer 104, which comprises a metal overcoating, should be deposited in such a manner that it produces a bright level coating in a minimum thickness. The deposit should be fine grained, so that no granular structure is revealed in the subsequent etchant procedure. Finally, the overcoating metal must be capable of being etched with good definition by a reagent which does not attack the underlying substrate (e.g. nickel) and which is also compatible with the photoresist. A method employed to deposit the overcoating metal is largely determined by the chemical nature of the metal involved. Where applicable, as for zinc and chromium, an electroplating procedure is the method of choice, since plating procedures and bath additives have been developed specifically to produce "level", "bright", deposits on a "rough" substrate. For active metals, such as aluminum, sputtering or evaporation techniques must be used.

Either a positive or a negative photoresist may be used. Best results have been obtained using Shipley AZ1350 positive photoresist, which has excellent definition and is not oxygen sensitive.

FIG. 2 illustrates the successive steps of a method which employs the recording blank of FIG. 1 for fabricating a metal master to be used in embossing a diffractive subtractive filter. First, as indicated by expose step 200, the photoresist layer 108 of the master blank is exposed to certain picture-information light defined by a spatial arrangement of contiguous white-manifesting regions and non-white manifesting regions. This may be accomplished by contact printing screened picture information on transparency 202 with light (represented by arrows 204) of a wavelength (such as blue or ultraviolet) to which photoresist 108 is sensitive. If this picture-information from transparency 202 is not already in half-tone form a suitable printing screen (not shown) may be employed in exposing photoresist 108 to the picture-information.

Photoresist 108 may be either a positive photoresist or a negative photoresist. If photoresist 108 is a positive photoresist, transparency 202 is a negative (i.e., white-manifesting regions of the picture-image information are opaque and non-white regions of the picture-information are transparent). If photoresist 108 is a negative photoresist transparency 202 is a positive (i.e. white-manifesting regions of the picture-image information are transparent and non-white manifesting regions are opaque). Although, in practice, a positive photoresist is used more extensively for fabricating an embossing master, for purposes of clarity in describing the method of the present invention, it is assumed that transparency 202 is a positive and, therefore, photoresist 108 is a negative photoresist. In accordance with this assumption, those portions of photoresist layer 108 which correspond to white-manifesting transparent regions 206 and 208 are exposed to light 204. However, those portions of photoresist layer 108 corresponding to non-light opaque regions 210, 212 and 214 of transparency 202, remain unexposed.

Develop step 207 is the second step. Development of photoresist layer 108 (which is assumed to be a negative photoresist) results in only the removal of all the unexposed photoresist. This reveals regions 106a (of the exterior surface of second metal layer 104) which underlie the non-white manifesting regions of the picture-image information. However, those portions of exterior surface 106 which underlie white-manifesting regions of the picture-image information remain unrevealed, since they are still covered by photoresist 108, as shown.

Etch step 209 is the third step. The given etchant is applied to revealed exterior surface 106a of second metal layer 104, which is effective in etching away all of those portions of second metal layer 104 which correspond to the non-white manifesting regions of the picture-image information. This results in those portions, such as 102a, of surface 102 of substrate 100 now being revealed, as shown. However, photoresist layer 108 and second metal layer 104 still cover those portions of surface 102 corresponding to the white-manifesting regions of the picture-image information.

The remove photoresist 211 step, which is the last step, results in the remainder of photoresist layer 108 being removed. This now reveals the exterior surface 106b of second metal layer 104 corresponding to the white-manifesting regions of the picture-image information. This final structure constitutes a metal master which may be utilized to emboss a diffractive subtractive filter of the picture-image information in a thermoplastic film.

Not all embossing masters should be in accordance with the method of the present invention, because due to undercutting by the etchant, the method of the present invention is applicable only to screened picture-image information having an upper resolution limit of about 100 lines per millimeter or less. Higher resolutions require the electroplating method disclosed in our aforesaid U.S. Pat. No. 4,108,660 which has a resolution limit of about 300 lines per millimeter. However, where applicable, the method of the present invention is preferable because of its simplicity in providing a master that produces good white-manifesting regions in the projected picture of an embossed diffractive subtractive filter, such as a microfiche.

When the second metal layer is composed of tin, zinc, aluminum, or chromium, cold dilute hydrochloric acid provides a good etchant because it does not attack the nickel base and, further, because it is compatible with most photoresist formulations. In the case of zinc, nitric acid, or a mixture of acetic and hydrochloric acids also provides a good etchant. When the second metal layer is composed of copper, chromic acid provides a good etchant.

What is claimed is:

1. A recording blank for use in recording a metal master of a given surface relief diffractive structure spatially modulated by screened spatial information; said blank comprising:
    a substrate having a given surface composed of a first given metal that is substantially inert to a given etchant, said surface of said substrate incorporating said given surface relief pattern diffractive structure unmodulated by said screened spatial information;
    said given surface of said substrate being covered by a layer of a second given metal which is etchable by said given etchant, said layer of said second given metal having one of two opposite surfaces in intimate contact with said given surface relief pattern, the other of said two opposite surfaces being smooth and level, and
    said other surface of said layer of said second given metal being covered by a layer of photoresist.

2. The recording blank defined in claim 1, wherein said entire substrate is composed of said first given metal.

3. The recording blank defined in claim 1, wherein the volume of said substrate is composed of a material other than said first given metal, and wherein said surface of said substrate is composed of a film of said first given metal.

4. The recording blank defined in claim 3, wherein the volume of said substrate is composed of said second given metal, and said film forms a barrier layer protecting the volume of said substrate from said given etchant.

5. A method employing a given recording blank for fabricating a metal master to be used in embossing a diffractive subtractive filter, representing certain picture-information defined by a spatial arrangement of contiguous white-manifesting regions and non-white manfesting regions, into a thermoplastic film, said given recording blank comprising a substrate having a given surface thereof composed of a first given metal that is substantially inert to a given etchant, said given surface being formed of at least one set of spaced line ridges defining a diffraction grating of a given profile and depth, said given surface being covered by a layer of a second given metal which when exposed to said given etchant is etchable by said given etchant, said second given metal layer filling the spaces between adjacent line ridges and providing a smooth and level exterior surface, said exterior surface of said second given metal layer being covered by a layer of photoresist; said method comprising the steps of:
    (a) exposing said photoresist to light manifesting said certain picture-image information;
    (b) removing all of said photoresist from solely said non-white manifesting regions thereby to reveal only those portions of said exterior surface of said second given metal layer underlying said non-white manifesting regions of said exposed photoresist;
    (c) etching the revealed portions of said second given metal layer with said given etchant to now reveal entirely the spaced line ridges of only those portions of said given surface of said substrate underlying said non-white manifesting regions, and
    (d) then removing all the remaining photoresist to now reveal those portions of said exterior surface of said second given metal layer underlying said white-manifesting regions of said exposed photoresist.

* * * * *